R. R. RUST.
PIPE JOINT.
APPLICATION FILED DEC. 6, 1910.
1,037,171. Patented Aug. 27, 1912.
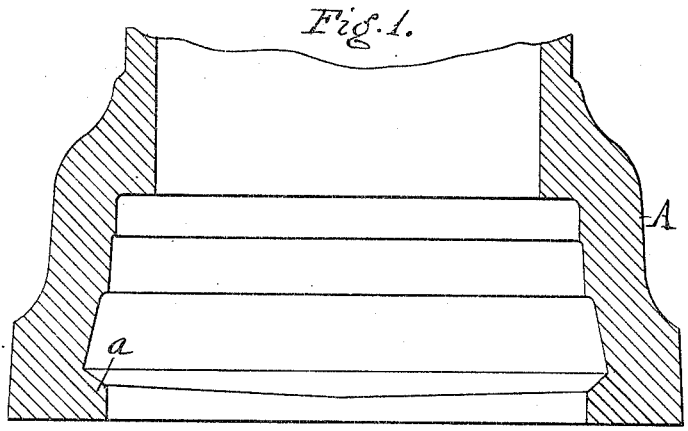
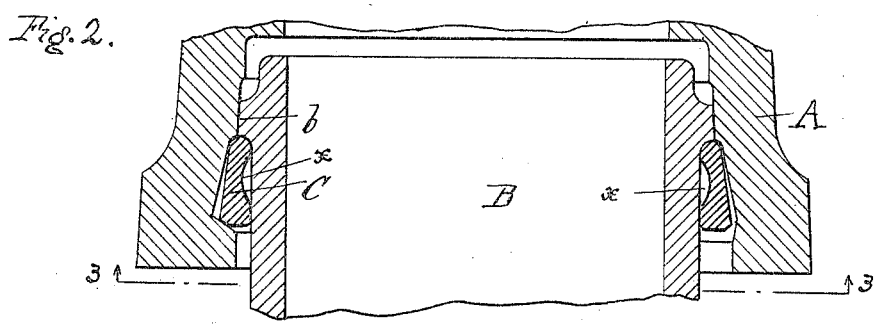
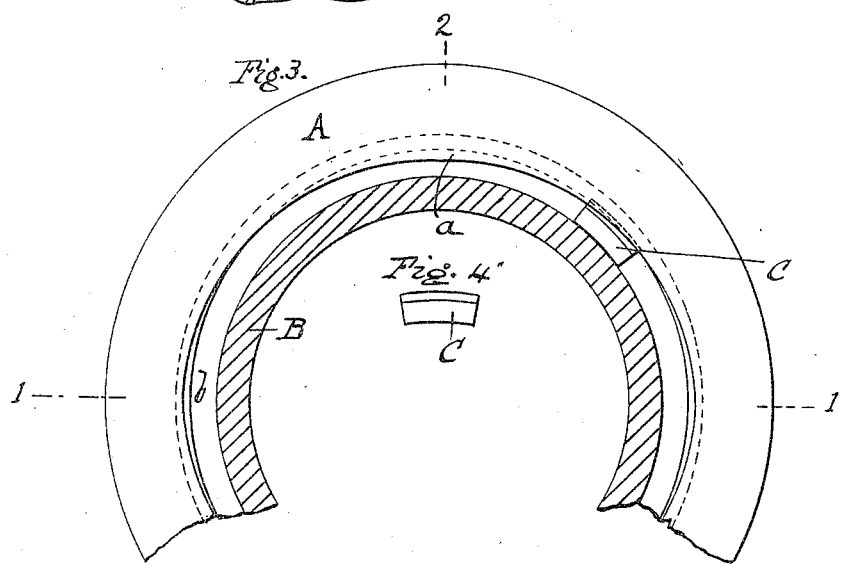
Witnesses:
L. H. Gyte
M. E. Keir
Inventor
Robert R. Rust
By his Attorneys
Howson and Howson

UNITED STATES PATENT OFFICE.

ROBERT R. RUST, OF NEW YORK, N. Y.

PIPE-JOINT.

1,037,171.      Specification of Letters Patent.      Patented Aug. 27, 1912.

Application filed December 6, 1910. Serial No. 595,876.

*To all whom it may concern:*

Be it known that I, ROBERT R. RUST, a citizen of the United States of America, residing in the city, county, and State of New York, have invented certain new and useful Improvements in Pipe-Joints, of which the following is a specification.

My invention relates to pipe joints and has for its object the provision of simple and efficient means to prevent the opening of the joint under the heavy stress to which it is ordinarily subjected.

In the accompanying drawings in which my invention is illustrated in one form, Figure 1 is a longitudinal section of the bell end of the pipe, on the line 1—1, Fig. 3; Fig. 2 is a section through a pipe joint on the line 1—2, Fig. 3, showing my locking wedge; Fig. 3 is a vertical section on the line 3—3, Fig. 2; Fig. 4 is a side elevation of the locking wedge.

After pipe lines are installed, there is frequently a certain amount of flexion at the joints due to the settling of the ground and to expansion and contraction resulting from the varying temperature conditions. Therefore a perfectly rigid joint cannot safely be made and a certain amount of play must always be allowed for at the joints. The latter are also subjected to severe strains by the heavy hydraulic pressure of the water flowing therethrough and suitable means must be provided to meet this strain, and to prevent the joint from opening.

In water mains as now generally constructed, it is customary to rely upon the end thrust of the adjoining pipes to maintain the joint between the same tight. In some cases straps are bolted or riveted around the joint to strengthen the same, but straps of this character are unsatisfactory since the joint is in the first place rendered too rigid thereby, and in the second place the bolts or rivets are soon rendered defective by the chemical action of the surrounding soil and the bands are thus weakened and fail to serve their purpose. Furthermore, if repairs are necessary at the joint, it is a tedious matter to remove the band in order to obtain access to the joint. As a much more convenient and safe means for locking the joint, I propose to form upon the bell end A of the pipe an inwardly faced abutment to engage a block interposed between this abutment and a coöperating abutment on the end of the spigot pipe. In the form shown in Figs. 1, 2 and 3, this abutment preferably takes the form of an inwardly turned flange $a$ between which and the rear face of the bearing flange $b$ of the spigot end B of the adjacent pipe a block C, as for example of malleable iron, may be inserted. In order to insert the block, the flange $a$ is made of varying diameter, preferably in the form of an ellipse, as shown in Fig. 3. The block C may be inserted at the point of greatest diameter of its flange $a$ (see right hand side of Fig. 2), and then forced around to the point of least diameter (left hand side of Fig. 2), where it is engaged between the flange $a$ and the rear face of the spigot flange $b$, as shown in Fig. 2. To give the block a wedge action, the flange $a$ may be beveled and inclined as shown in Fig. 1. Obviously, however, this inclination of the flange is not necessary since the block may be applied after the joint has been completely made and it will then serve merely to prevent the opening of the joint without serving also to force the meeting faces of the pipe ends into closer engagement. Where a block of this character is employed, I propose to recess the same as at X so that under a strain so heavy as to endanger the pipe, the wedge itself may buckle slightly, thus permitting the joint to yield somewhat without at the same time allowing it to open. It will be noted also that at the point of greatest diameter of the flange $a$ there is still a slight bevel which is sufficient to retain the calking material usually employed.

While the elliptical form of the abutment flange $a$, as shown in the drawings, is my preferred construction, obviously the flange may be given any desired form for this purpose, or the abutment for the block may be provided in any other suitable way upon the bell mouth, and I do not limit myself to the precise form shown. Nor is it necessary that the abutment on the spigot end be the rear face of the flange $b$. Any suitable abutment to engage the other face of the wedge may be especially formed on the spigot end, if desired.

In adjusted position the block is preferably located only at the point of anticipated flexion of the joint under hydraulic stress, so that the joint is still left free to yield slightly in different planes under strains due to settling or varying temperature conditions. The joint is readily opened by merely forcing the wedge around to its entrance point and removing it, whereupon the pipe ends are free to be separated.

I claim as my invention—

1. A pipe joint comprising a bell end and a spigot end, the bell end having a noncircular inwardly projecting abutment, and the spigot end having a coöperating abutment spaced from the rear face of said inwardly projecting abutment when the joint is made in combination with an independent lock block adapted to be inserted longitudinally into the bell end at the point of greater diameter of said inwardly projecting abutment and then be forced circumferentially around into engaging position between said coöperating abutments, substantially as described.

2. A pipe joint comprising a bell and a spigot end, the bell end having an elliptical inwardly projecting abutment flange and the spigot end having a coöperative abutment spaced from the rear face of said inwardly projecting abutment when the joint is made in combination with an independent lock block adapted to be inserted longitudinally into the bell end at the point of the long diameter of the elliptical abutment flange and then be forced circumferentially around into engaging position between said coöperating abutments at the small diameter of said elliptical flange, substantially as described.

3. A pipe joint comprising a bell end and a spigot end, the bell end having a non-circular inwardly projecting abutment and the spigot end having a coöperating abutment spaced from the rear face of said inwardly projecting abutment when the joint is made, in combination with an independent segmental lock block adapted to be inserted longitudinally into the bell end at the point of greater diameter of said inwardly projecting abutment and then be forced circumferentially around into engaging position between said coöperating abutments to prevent the opening of the joint by the longitudinal separation of the pipe lengths, substantially as described.

In testimony whereof I have signed my name to this specification, in the presence of two subscribing witnesses.

ROBERT R. RUST.

Witnesses:
  WALTER ABBE,
  M. E. KEIR.